Feb. 20, 1945.                H. R. CRANE                 2,369,719
                          BORE PLASTERING TROWEL
                            Filed May 25, 1943
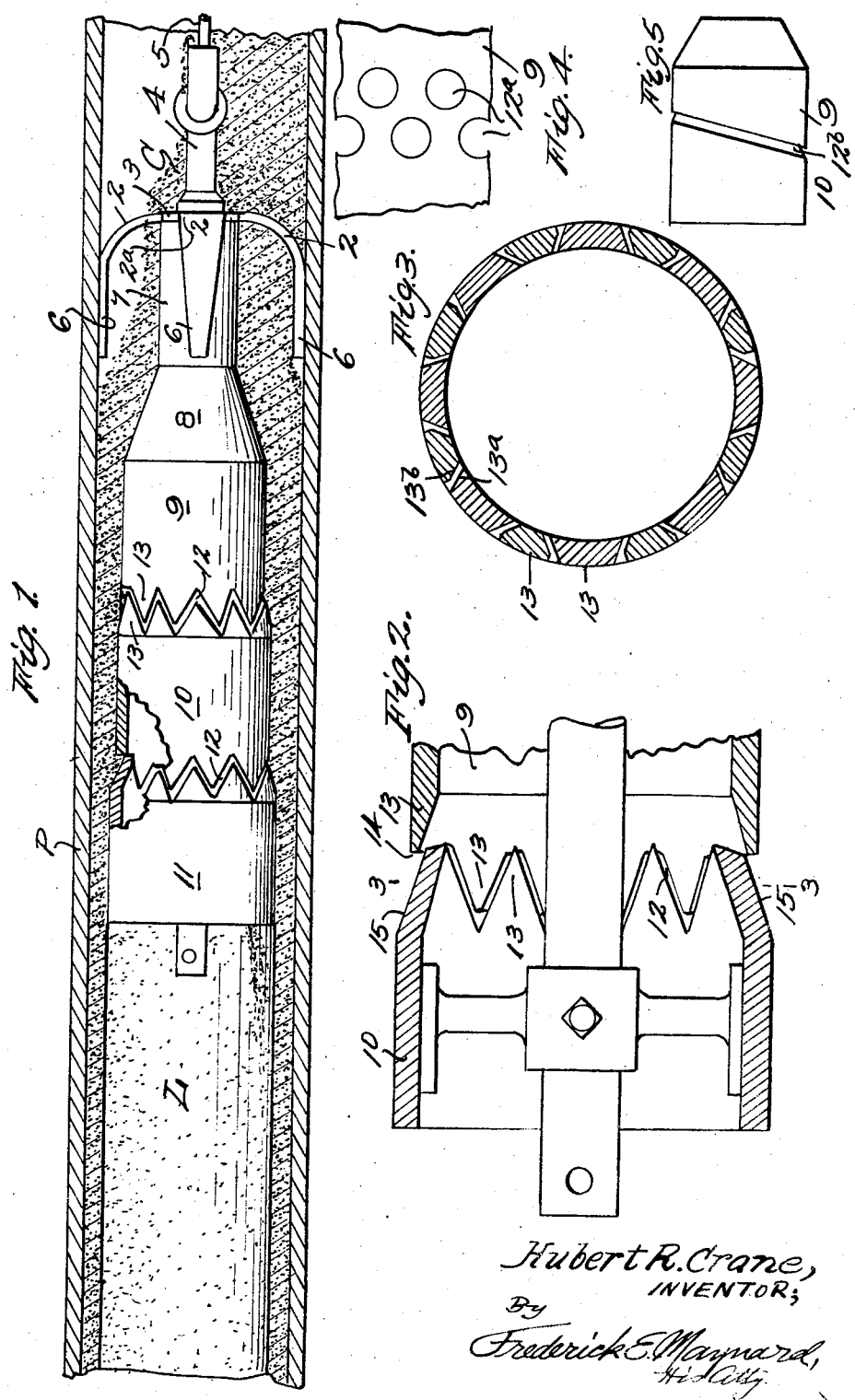
Hubert R. Crane,
INVENTOR;
By Frederick E. Maynard,
His Atty.

Patented Feb. 20, 1945

2,369,719

UNITED STATES PATENT OFFICE 2,369,719

BORE PLASTERING TROWEL

Hubert R. Crane, Los Angeles, Calif.

Application May 25, 1943, Serial No. 488,468

12 Claims. (Cl. 25—38)

This invention is a cylindric trowel adapted for use in pressing a desired plastic to the bore face of given conduits; more especially underground or otherwise installed water system mains.

It has long been proposed to line water main pipes with a cementitious, self-setting plastic, so the life of the old pipe might be much extended in length. Hydraulic cement contains, before well set, a large volume of water, and the more water extruded at the time of plastering, the stiffer will be the laid plaster and the less likely it will be to slump in such cases where the applied mass has no supporting mold—as in the lining of pipe as here disclosed. Not only is it desirable to dehydrate the plastic at the time it is being applied but, further, it is desired to compact the solid and firmly interlock the fine ingredients so that, in the case of water pipe linings with hydraulic cement the common effect of formation of a chordal bottom bed of cementitious material can be prevented or materially reduced. If the solids in the cement can be practically totally interlocked in the compacted lining then the extruded water will be too thin a mix to make a hard cement bed in the bottom of the bore of the laid lining, and, moreover, the excess water can be diluted and washed away over the laid lining even before it has completely set.

The success of the dehydration depends of course on how and with what it is done. It has been proposed to drag a perforated cylinder along the laid lining in a pipe, but it will quickly be seen that in such operation the imperforate portions of the face of the cylinder—the surface lying between contiguous perforations will have a considerable coat of the extruded water but this coat will not be drained because of absence of adjacent way of escape and the consequence is that after the cylinder has passed all of the surface water will be left to later weep from the lining and carry enough of the fine cement to make a rich grout and harden to form a chordate bed across the bottom of the lining passageway.

It is highly desirable that a considerable length of the lining be laid and compressed to interlock the cement solids before the lining be dehydrated.

It is, therefore, objects of this invention to provide a means and a method for overcoming the objections hereinabove mentioned.

Further, an object of the invention is to provide a simple, substantial, low-cost and efficient apparatus for dispersing, for compacting and for dehydrating a given plastic in the bore of a pipe and onto the bore face.

Particularly, an object of the invention is to provide a cylindrical trowelling device in which there is a circumferentially complete dehydrating port, whereby there will always be presented to the lining bore face an annular area of full circle length to allow the surface water to escape. But at the same time, an object is to provide a trowelling device which at no transverse plane is wholly without an effective plastering or compacting area; in other words, at no place has an escape port which can be divided by a plane transverse to the trowel axis, of any angle whatsoever. This, therefore is provision of means to prevent the slumping down of any noticeable lump of the lining at the dehydrating port area as could happen if the plastic is low in viscosity or if it has not been compacted enough.

More specifically, a purpose of the invention is to provide a barrel trowel having its shell provided with a peripheral zone having a zig-zagged opening port feature constituting in effect a completely annular escape way for water.

The invention consists of certain advancements in the art of plastering conduit bores as set forth in the ensuing description and having with the above, additional objects and advantages as hereinafter developed, and whose construction, combinations, and details of means, and the manner of operation, and the method, will be made manifest in the following description of the herewith illustrative embodiment; it being understood that modifications, variations and adaptations may be resorted to within the scope, spirit and principle of the invention as it is more particularly claimed in the addendum.

Figure 1 is a side elevation of the tool assembly, as in bore plastering use.

Figure 2 is an axial, detail section of the tool barrel trowel structure.

Figure 3 is a cross-section on line 3—3 of Fig. 2.

Figure 4 is a diagram of a modified form of the annular water escape outlet zone.

Figure 5 is a side elevation of circumferential, oblique-line creviced trowel.

A pipe P to be circumferentially lined is charged in a desired method with the plastic material—in this instance a hydraulic cement C, in quantity to make the ultimate lining L.

The tool here shown includes a suitable leader or centering spider having set of outwardly radiated legs 2 from a frontal hub 3 suitably rigidly fixed onto a central shaft 4 to the fore end of which is hitched any suitable pulling or draft line 5. This spider has plural functions; one, is by the broad front face of its legs to aid in dispersing or plowing outwardly the encountered cement,—second, to centralize the trowelling body structure of the tool attached rearwardly thereof,—three, to enable quick reduction of objectionable channels which it may create as its elongate centering toes drag through that part of the plaster it pushes past and which lies along the bore face of the pipe engaged by the outer face of the toes 6 for centering purpose. While the front face of the legs are broad (at 2a) the toes 6 converge rearwardly in width with the result that the fluid plastic inherently closes the void or channel dug by the tracking toes, or the plastic mass will be forcibly compacted to obliterate the voids, as disclosed shortly.

Fixed on the shaft 4 in a position immediately in the rear of the spider hub 3 is a somewhat elongate core or ram 7 at about the rear end of which the toes 6 terminate. Immediately at the rear end of the ram 7 is a flaring nose 8 based on the front end of a cylindric dispersing and compacting member 9 which, as it is pulled forward, is the primary means for applying the dispersed plastic in a circumferential lining form on the bore face of the pipe P.

Following the compacting member or body part 9 is a second and preferably somewhat larger cylindric compacting member 10 to give the applied lining a greater degree of compression, and if desired, and preferably, the member 10 is followed by a larger, cylindric compacting member 11 and this may have a polished or semi-polished face to very smoothly finish off the face of the plaster lining. It will be seen that as the lining L is more and more compressed that it will stand some load and therefore will act to automatically center the rear end of the tool.

Another distinctive feature of this invention is in the provision of a peculiar device to enable the escape of water extruded under compression forces applied to the wet lining. This device is predicated on the principle that the tool has a circumferential zone apertured in a manner to get the water, extruded by compression, out of the path of operation of the final compacting or compressing portion of the tool so that water once extruded will not be again subjected to forces tending to drive it back into the cement lining.

Or, in other words, the principle is to provide out as much water as may be practical by one or more steps of cylindric trowelling and conveying off the water extruded in a separate stream whilst the final compacting and smoothing trowel is at work on the dehydrated lining surface. By this principle and means the serious objection set forth in Scott's U. S. Patent No. 2,293,365, of 1942, is overcome or greatly reduced; the objection being the tendency of the extruded water and cement to collect as sediment and make a chordate bed on the bottom of the plastic lining. This objection is here overcome for the reason that the extruded water is not again pressed into the face of the plastic lining by the operating tool such as seen in Scott's patent and the art cited therein, and especially the Newsom Patents Nos 1,548,161 and 1,629,292. By this tool here disclosed water is extruded and as much as possible of the fine cement is pushed into the lining face and compressed therein and the water is run off separately from the final compressing action. In prior art cement spreaders the water was again swashed by the nose of the spreaders to the lining face and then, after the spreader had passed by, rivuletted down the sides of the face to make a thick, rich cement mat with a more or less chordal surface.

It is desired to de-water a complete annular zone of the face of the spread lining of plaster, in contrast to the old practice of de-watering by means of a peripheral circle of spaced apertures leaving lanes of the surface still heavily charged with the water content, which greatly aggravated the collection of rich cement at the bottom of the lining. Draining of the annular zone is accomplished in the present invention by so aperturing the tool through its body wall that water may pass at every point in a full circle about the cylindric wall, in a zone of desired axial length, into the chamber of the tool, which is made hollow so as to convey off the extracted water in a path separate from the final compacting face of the tool. In Fig. 1, the successive compacting members are shown as separated by a narrow (but variable) zig-zag or serpentine crevice 12 produced between the interlaced saw-tooth formations 13 of the contiguous end edges of the axially adjacent members 9, 10 and 11. To make a restrictive passageway against too free a flow of the solids of the plastic cement the forward facing sides 13a of some of the teeth are bevelled and underlie the adjacent faces 13b of the opposite, rearwardly pointing teeth of the gangs. Thus a considerable length and area of opening for water escape is presented but at the same time the solids are rejected and sent back to the face of the plastic lining L.

As clearly shown in Fig. 2, the rearwardly facing teeth 13 have right-angled end shoulders 14 and the top faces of the forwardly facing teeth are inclined forwardly and inwardly at 15 whereby to form slight pockets into which the laid plaster may somewhat expand (if so inclined) and in which water may collect on its way to the escape aperture 12. The fine cement collecting on the faces 15 are again forced out to and compressed in the face of the lining L.

Fig. 4 shows a circular series of holes 12a so staggered and of such size that they, in the aggregate, make a completely circular draining zone in the tool wall. The aperture formations in the several disclosed patterns avoid the presentation of an opening which can be divided in two by a cross-section plane taken at any angle as to the axis of the tool; that is, the device presents trowelling area at every possible transverse section plane of the dehydrating zone. A large de-watering area is secured with a slight loss of trowel face on any cross-section plane.

What is claimed is:

1. A hollow trowel for plastic bore face lining, having a body structure open at the rear end for drainage flow and provided with a completely annular, water escape passage feature from the exterior face of the body to its chamber for rear flow.

2. The trowel of claim 1; the passage being characteristically of saw tooth interindented pattern.

3. A hollow trowel for plastering the bore face of a conduit, having a body structure of cylindrical sections open from end to end and provided with a water escape feature from the exterior face of the body to its interior and which at every point in a peripheral zone will have an opening on sections taken longitudinally of the wall of the body.

4. A trowel of the class disclosed and having a hollow, open rear end body structure having a peripherally complete de-watering crevice.

5. The trowel of claim 4; and which crevice is of sinuous outline.

6. The trowel of claim 4; and which crevice is of saw-tooth outline.

7. The trowel of claim 4; and in which the contiguous edges of crevice are in relatively overhanging relation; the leading edge of the crevice overhanging the following edge.

8. The trowel of claim 4; and in which the face of the trailing side of the crevice underlies the other side of the crevice to form a restriction.

9. A hollow trowel of the class described and having a body structure having a de-watering aperture the face of the trailing side of which is contiguous to and underlies the face of the opposite face.

10. A trowel of the class disclosed and including a cylindric body of hollow structure and separated by annular crevices into a plurality of successive intercommunicating plaster compacting members; the series of members being open from end to end for rear flow of water.

11. The trowel of claim 10; the contiguous ends of the members being of an interindenting zig-zag pattern.

12. A trowel of the class described and including a cylindric, hollow body structure open from end to end provided with an aperture device which is effectively peripherally complete around the body to drain from its exterior into its chamber.

HUBERT R. CRANE.